United States Patent
Patterson et al.

(12)

(10) Patent No.: US 6,357,579 B1
(45) Date of Patent: *Mar. 19, 2002

(54) LINEAR MOTOR DRIVE FOR VIBRATORY FEEDERS AND CONVEYORS

(75) Inventors: Harold E. Patterson, Indiana; Stanley P. Turcheck, Jr., Homer City, both of PA (US)

(73) Assignee: FMC Technologies, Inc., Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,636

(22) Filed: Sep. 8, 1998

(51) Int. Cl.$^7$ ................................................ B65G 27/28
(52) U.S. Cl. ...................... 198/766; 198/769; 198/763; 198/760
(58) Field of Search .................. 198/769, 766, 198/763, 771, 759, 760, 753, 752.1

(56) References Cited

U.S. PATENT DOCUMENTS

| | | | | |
|---|---|---|---|---|
| 3,276,307 A | * | 10/1966 | Williamson | 198/766 |
| 3,552,545 A | * | 1/1971 | Hartman | 198/220 |
| 3,716,130 A | * | 2/1973 | Morris | 198/220 |
| 4,149,627 A | * | 4/1979 | Dumbaugh et al. | 198/766 |
| 4,331,263 A | * | 5/1982 | Brown | 198/769 |
| 4,371,800 A | | 2/1983 | Brander | |
| 4,404,671 A | | 9/1983 | Kruibayashi et al. | |
| 4,583,027 A | | 4/1986 | Parker et al. | |
| 4,585,337 A | | 4/1986 | Phillips | |
| 4,921,090 A | | 5/1990 | Gregor | |
| 4,961,491 A | * | 10/1990 | Falconer | 198/769 |
| 4,979,608 A | * | 12/1990 | Mikata et al. | 198/769 |
| 5,285,890 A | * | 2/1994 | Stearns | 198/766 |
| 5,409,101 A | | 4/1995 | Ahmed et al. | |
| 5,462,155 A | * | 10/1995 | Demar et al. | 198/760 |
| 5,602,431 A | | 2/1997 | Satomi et al. | |
| 5,602,433 A | * | 2/1997 | Brence et al. | 310/17 |

OTHER PUBLICATIONS

"Better motion control", Leslie Langnua, Associate Editor, Power Transmission Design, Apr. 1995, pp. 55–57.
Avcon brochure, 4 pages.

* cited by examiner

*Primary Examiner*—Douglas Hess
(74) *Attorney, Agent, or Firm*—Rockey, Milnamow & Katz, Ltd.

(57) ABSTRACT

A differential motion conveyor includes a cylindrical moving magnet linear motor to drive a trough into vibration to convey material. The linear motor utilizes a compact, efficient and powerful design using an annular stator which drives an armature. The armature includes opposing shaft ends which are connected to either the trough or to a conveyor base, or to a counterweight depending on the conveyor design, to drive the trough into reciprocation to feed particles along the trough.

10 Claims, 9 Drawing Sheets

LINEAR MOTOR DRIVE FOR VIBRATORY FEEDERS AND CONVEYORS

TECHNICAL FIELD OF THE INVENTION

The present invention relates to vibratory feeders and conveyors. Particularly, the invention relates to linear motor drives for differential motion conveyors.

BACKGROUND OF THE INVENTION

Conventional designs of reciprocating vibratory conveyors usually employ electromagnetic drives, or motor driven mechanical drives. An electromagnetic drive utilizes the oscillating magnetic attraction between a magnet armature and a pole face of a magnet. Practical use of the electromagnetic drive requires that the magnet armature be in relative close proximity to be attracted to the pole face of the magnet, putting a severe limitation on the maximum stroke obtainable, usually under 0.1 inches. The design must operate at higher frequencies, about 30 Hz and higher, in order to achieve the accelerations needed to obtain the desired conveying feed rates. Motor driven mechanical drives typically include rotary motors that spin eccentric weights or turn shafts which are connected to cams or crank arms. Mechanical drives convert rotary motion to linear vibratory motion and produce some form of harmonically varying stroke at a set frequency. Mechanical drives generally operate at strokes up to 1 inch, at frequencies ranging from 8 Hz to 20 Hz.

One type of reciprocating vibratory conveyor is known as a differential motion conveyor. This type of conveyor utilizes a motor driven mechanism containing at least two geared shafts with weights of differing eccentricities on each shaft. The mechanism produces a linear reciprocal horizontal motion of the conveying surface that has a lower acceleration and velocity in the forward direction than in its rearward direction. This difference in acceleration and velocity allows the product being conveyed to slip less in the forward direction than when the conveying surface is accelerating in its rearward direction, thus the product moves forward along the conveying surface. Differential motion conveyors are manufactured for example by FMC Corporation's Material Handling Equipment Division of Homer City, Pa.

There exists prior art in which some form of an electromagnetic linear motor is used as a drive mechanism for vibratory feeders and conveyors. Examples of linear motors are disclosed in U.S. Pat. No. 4,371,800 assigned to ICAL, U.S. Pat. No. 4,921,090 assigned to FMC Corporation, and U.S. Pat. No. 5,409,101, assigned to Allen Fruit Company.

There are three general types of electromagnetic linear motors. A voice coil actuator uses a coil located in a magnetic field which exerts a force on the coil when a current is conducted through the coil. A voice coil actuator is typically used in audio speakers and disk drive positioners. An induction motor uses a stator having coils and an armature made of magnetic material. Induction of currents generated in the armature creates magnetic fields which are either attracted or repulsed by magnetic fields generated by the stator coils. Induction motors are typically used as motors for trains and monorails. A moving magnet motor uses a stator with a plurality of coils which are sequentially energized by a control. An armature carrying permanent magnets is moved in relation to the stator by the energized coils. Moving magnet motors have been used for precision positioning applications.

The present inventors have recognized that it would be advantageous to produce an electromagnetic, linear-motor-driven differential motion conveyor which is not large and complex, and which contains a minimum amount of small components that otherwise make the conveyor difficult to assemble and set up. The present inventors have recognized that it would be advantageous to produce a linear motor drive for a differential motion conveyor which is capable of producing the power or stroke required for an effective and efficient conveyor.

SUMMARY OF THE INVENTION

A differential motion conveyor or feeder is contemplated which includes: a base; a trough supported from the base, and a cylindrical linear motor having an armature and an annular stator surrounding the armature. In the preferred arrangement, the stator includes a series of coils spaced along a length of the stator, and the armature includes a series of magnets spaced along a length of the armature. Other cylindrical electromagnetic linear motors are also encompassed by the invention, such as for example, a stator having magnets and an armature having coils. One of the annular stator or the armature is operatively connected to the trough for driving the trough into reciprocation.

In one variation of the invention, the differential motion conveyor or feeder can advantageously have the stator rigidly, operatively connected to a rigid base and the armature rigidly, operatively connected to the trough. The trough can be supported from the base on springs.

In another variation of the invention, the trough is supported from the base on leaf springs, the stator is rigidly, operatively connected to the base, the armature is rigidly, operatively connected to the trough, and the base is supported on base springs.

In a further variation of the invention, the trough is supported from the base on leaf springs, the stator is rigidly, operatively connected to the base, the base is supported on base springs, and the armature is rigidly, operatively connected to a counterweight or block.

In a still further variation of the invention, the trough is supported from the base by support springs, and the stator is rigidly, operatively connected to the base and the armature is operatively connected to the trough by a "soft start" trough spring. The base is supported on pedestals or base springs depending on the mode of operation of the conveyor.

The present invention makes the use of linear motor technology practical for vibratory feeder and conveyor applications, by minimizing the number of component parts, by enhancing overall size reduction, by providing a rugged industrial construction, all by contemplating the use of a cylindrical moving magnet linear motor, originally utilized for precision linear positioning applications.

Whereas some conventional motors for differential motion conveyors are limited in stroke length and operational flexibility, the moving magnet linear motor of the present invention may have strokes of 1" to 12" and even longer depending on its design and geometry. The linear motor may be operated at various displacement speeds, and made to reciprocate about a point at different speeds in one direction than in the opposite direction. The linear motor may be operated to reverse the speed direction if required. Whereas mechanical type, motor driven vibratory mechanisms require secondary mechanisms to produce linear vibratory motion, the linear motor eliminates the secondary mechanisms such as belts, pulleys, shafts etc., and is not limited to producing harmonic velocity patterns of motion. The linear motor eliminates the need for large complex mechanisms used to drive mechanical differential motion conveyors and can readily be adapted to produce the differential velocities and accelerations required for conveying material.

The linear motor eliminates the need for the gears, shafts and eccentric weights of the prior art mechanical drives. The disclosed invention solves the problems of prior attempts at linear motor drives for differential motion conveyors through the use of a cylindrical moving magnet linear motor that is compact in size, being about the size of conventional AC voltage rotary motors. The linear motor has a rugged, enclosed industrial design. The linear motor has a flexible geometry that allows easy adaptation to various configurations of vibratory feeders and conveyors.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated. Identical reference numbers used throughout the figures represent substantially identical components as those described initially.

Figure 1:
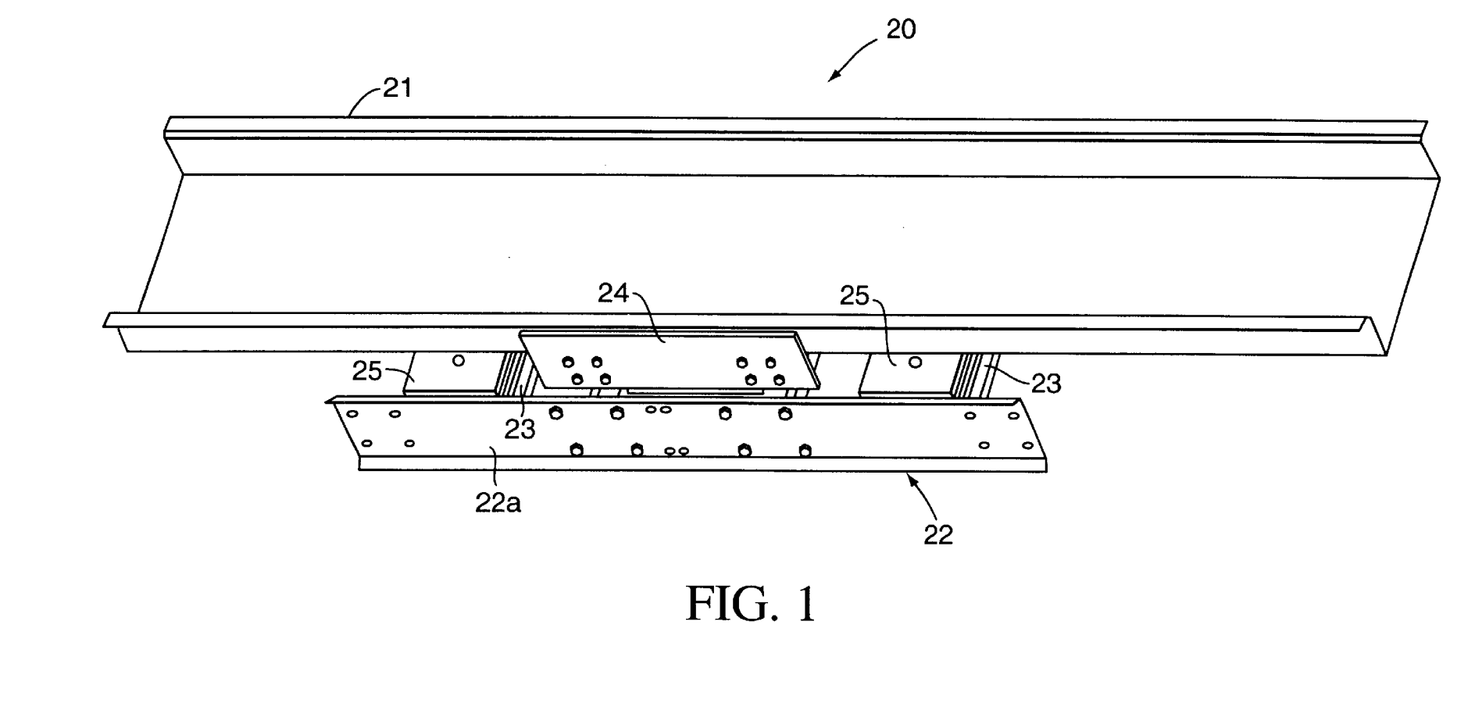
FIG. 1 is a top perspective view of a conveyor of the present invention.

FIG. 1 illustrates a linear differential motion conveyor 20 of the present invention. The present invention encompasses both conveyors and feeders, for simplicity, only the term "conveyor" will be used, and this term shall be taken to mean either a conveyor or a feeder. A trough 21 or other conveying member is connected by means of trough mounting brackets 24 to one part of a linear motor drive 26, hidden from view in this figure. The other part of the linear motor drive, which is relatively oscillated with respect to the one part, is connected to a tubular base frame, also hidden from view, which is connected by bolt means, other fasteners, or by welding, to a base 22 formed by left and right base members 22a, 22b. The left and right base members 22a, 22b are connected together by means of cross connector members 23 which may be made from steel tubing or fabricated from steel plate. Weights 25 may be added to the base members 22a, 22b and the cross connector members 23, to dynamically balance the conveyor to prevent unwanted motion such as pitching.

Figure 2:
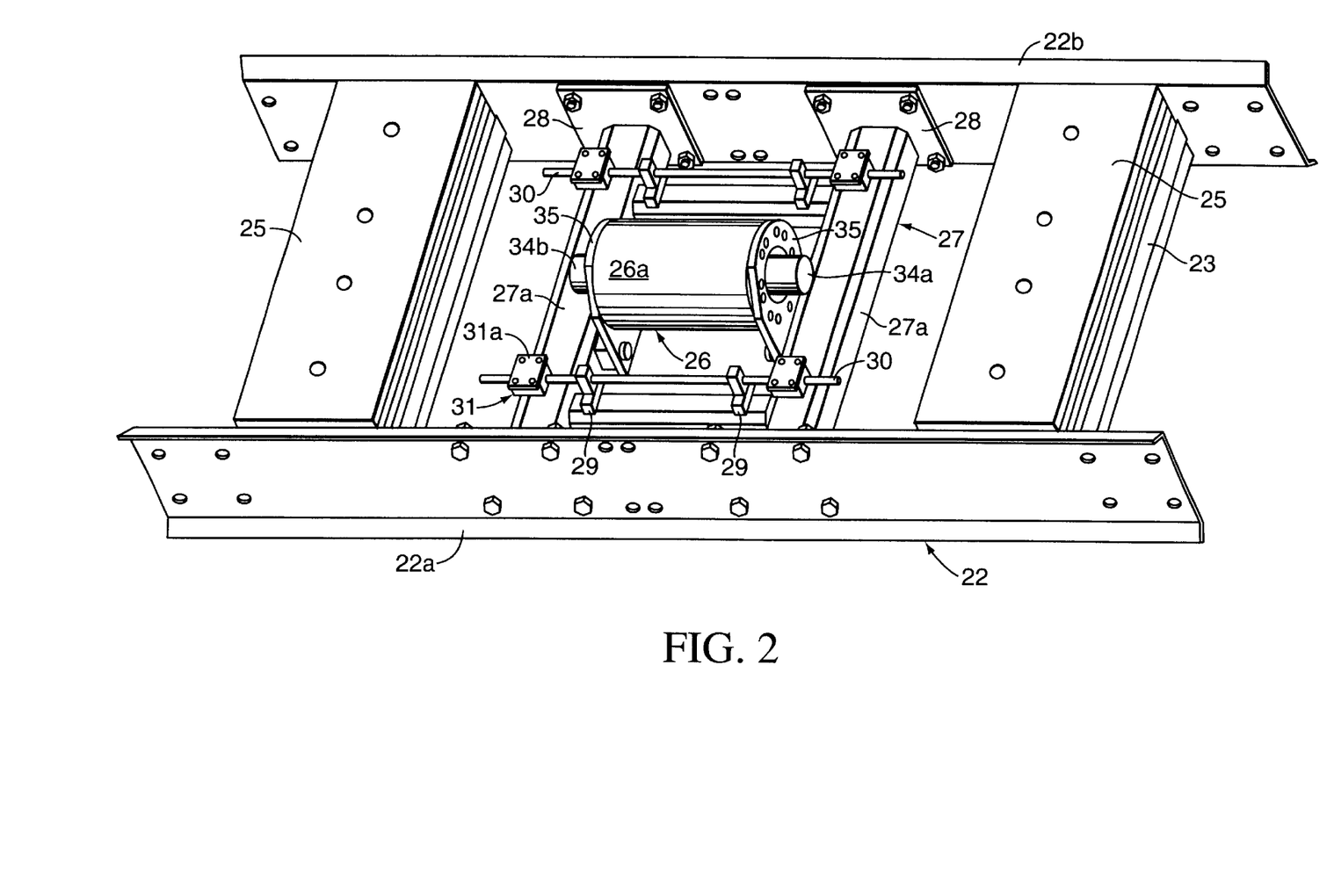
FIG. 2 is a top perspective view of the conveyor of FIG. 1 with the conveyor trough and mounting frame removed for clarity.

As illustrated in FIG. 2, the trough 21 is removed to show details of the linear motor drive and associated structure. The linear motor 26 is preferably a moving magnet linear motor such as a model #2518 linear motor available from California Linear Devices Inc., (formerly Avcon) 21050 Erwin St., Woodland Hills, Calif. 91367. The linear motor is described in more detail below with regard to FIG. 8. A case or housing 26a of the linear motor 26 is mounted by plate brackets 35, one on each side of the motor, to a drive frame 27. Two slide rods 30 are also mounted fixedly onto the drive frame 27, by means of support blocks 29, for example, those manufactured by the Thompson Co. part #SB-8. The slide rods 30 are mounted one on each side of, and adjacent to, the linear motor 26. The slide rods extend lengthwise, along a direction of material conveyance of the trough 21. Linear motion ball bearings 31 are slidably mounted on each of the four ends of the slide rods 30. The bearings can be Thompson Linear Super Smart Ball Bushings SS6 UPB-8. Drive frame cross members 27a of the drive frame 27 are each connected to the left and right base members 22a, 22b, by means of brackets 28 welded to the cross members 27a and bolted to the base members 22a,b. The linear motor 26 includes an armature 34 (shown in FIG. 8) within the case 26a. The armature includes exposed armature shaft ends 34a, 34b.

Figure 3:
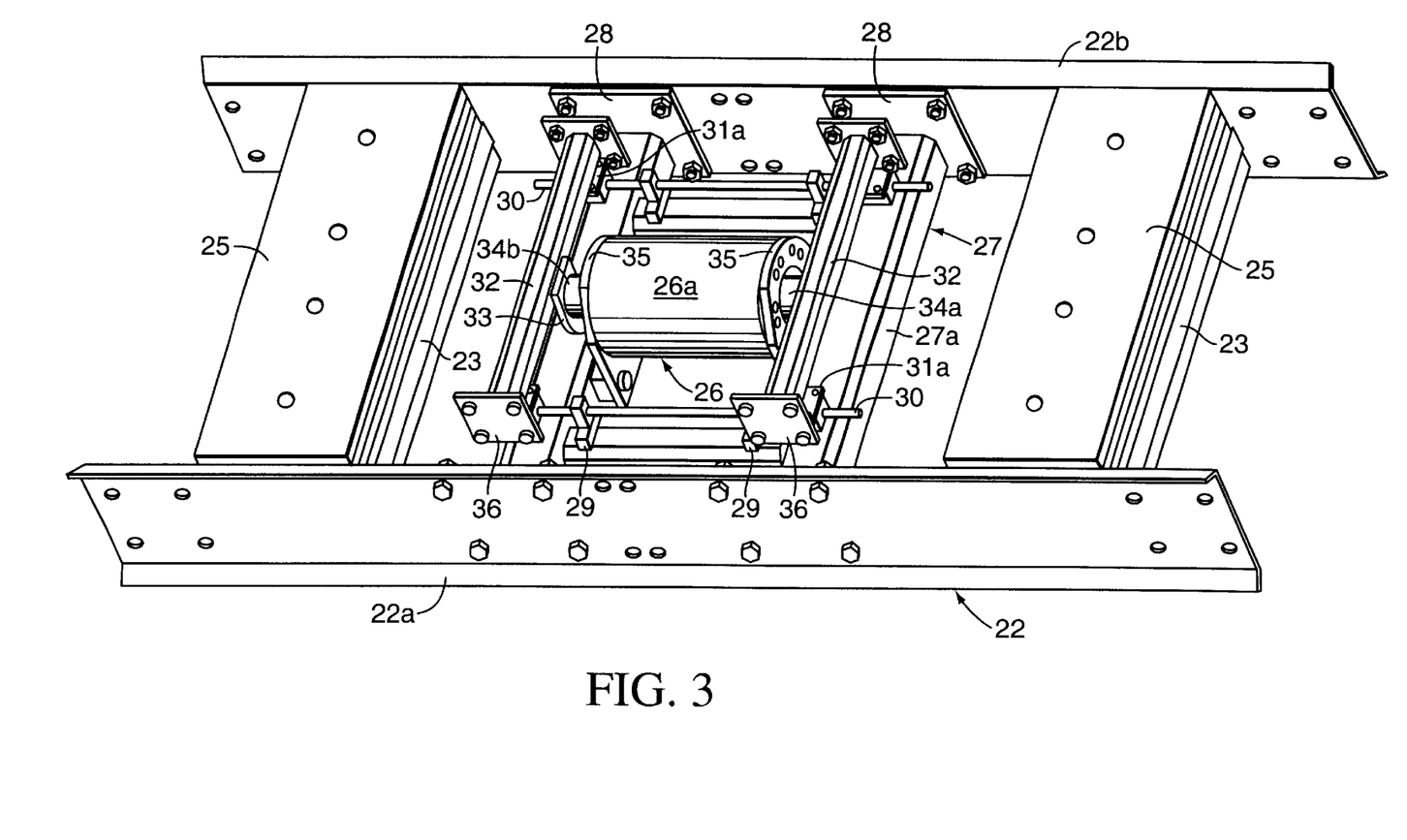
FIG. 3 is a top perspective view of the conveyor of FIG. 2 with a trough mounting frame installed.

FIG. 3 includes trough connection details. Two cross frame members 32, one located transversely at each end of the linear motor 26, are fastened to mounting plates 31a of the linear motion ball bearings 31. The cross frame members 32 are then connected to the trough mounting brackets 24, shown in FIG. 1, by means of the cross frame mounting brackets 36 which are welded to each of the ends of the two cross frame members 32. The trough mounting brackets 24 are fastened to the trough 21 as shown in FIG. 1. The armature shaft ends 34a, 34b, of the linear motor 26, are connected to armature brackets 33, which are connected to the mid points of the two transverse cross frame members 32.

The differential motion conveyors described herein can be operated in a similar manner to the device disclosed in U.S. Pat. No. 5,409,101, assigned to Allen Fruit Company, herein incorporated by reference. An important improvement of the present invention is the discovery and use of the cylindrical moving magnet linear motor 26, in a differential motion conveyor. The linear motor 26 is advantageous over the relatively large magnetic drive device as disclosed in FIGS. 1 through 4 of U.S. Pat. No. 5,409,101.

Referring to FIGS. 2 through 3, the case 26a of the linear motor 6 is rigidly secured to the conveyor base 22 by the frame members 27. The armature shaft ends 34a, 34b of the linear motor 6 are connected to the cross frame members 32. The cross frame members 32 slide longitudinally on the slide rods 30, by means of the linear motion ball bearings 31. The cross frame members 32 are operatively connected to the conveyor trough 21. When the linear motor 26 is activated through a microprocessor control system (described below), the armature shaft ends 34a, 34b can be made to move back and forth in a linear motion relative to the linear motor case 26a. The conveyor trough 21 moves linearly with the armature shaft ends 34a, 34b, relative to the base 22, since the linear motor case 26a is rigidly connected to, and thus becomes part of, the base 22. In operation, the linear motor 26 is programmed to produce a linear reciprocal horizontal motion of the conveying surface that has a lower velocity and acceleration in the forward direction than in its rearward direction. This difference in velocity and acceleration allows the product being conveyed to slip less in the forward direction than when the conveying surface is accelerating in its rearward direction, thus the product moves forward along the conveying surface. Generally, the material will feed (move) in the direction during which the material is in contact with the conveying surface for the longest period of time. It can be seen therefore that by reversing the velocity pattern of the conveying surface, the feed direction will also be reversed, providing the user with additional process flexibility.

The moving magnet linear motor 26, such as the California Linear Devices linear motor, is capable of producing maximum strokes from 6 in. to 16 in. long, continuous forces from 30 to 1650 lbs., and accelerations from 26 to 53 g's, depending on the model, to cover a broad range of conveying applications. The California Linear Devices model #2518, for example, has a maximum stroke of 12 inches, has acceleration up to 32 g's, is rated at 500 lbs. of force, continuous duty, and yet only has an overall frame length of 15.3 inches.

Figure 9:
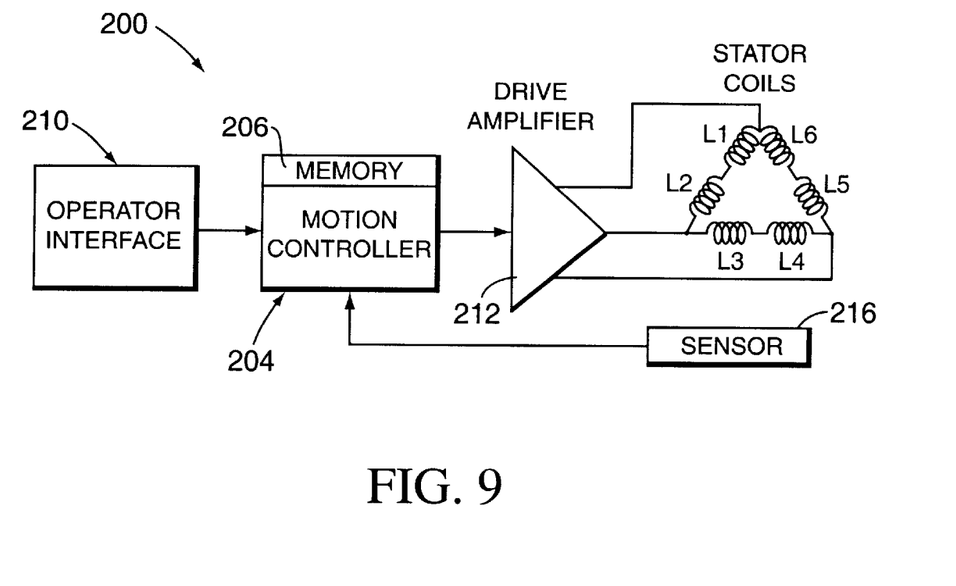
FIG. 9 is a control schematic for the linear motor of the present invention.

A microprocessor control system 200 is illustrated in FIG. 9. The system includes a controller 204, such as California Linear Devices part number PN 15-11095, with a program memory 206. An operator or programmer interface 210 allows communication with the controller 204 to input power cycles or patterns and to make selections and adjustments. The controller 206 controls a drive amplifier 212 which provides synchronized and selected three phase power to the stator coils. The stator and armature can thus be configured into a powerful and compact linear motor,. The control system is capable of controlling the linear motion of the armature of the linear motor 26 by operator programming of displacement, displacement direction, acceleration, and "jerk" ("jerk" being the incremental change in acceleration). Furthermore, such programs may be stored in controller memory 206 for later recall.

Thus, a wide variety of velocity-versus-time motion profiles may be generated to optimize the feed rate of a given material being conveyed, and which may be altered by the operator to suit different materials or conditions by recalling the appropriate program For example, food manufacturers often use the same equipment to feed different products to their packaging equipment, as required by their production schedule, which may require different feed profiles to maintain the same output. As another example, one conveyor in a line of conveyors may have to be inclined slightly, requiring a different velocity profile than the other conveyors to optimize feed rate. Also, the mirror image of any velocity profile program may be recalled by the operator to reverse the direction the material is being fed on the conveying surface, as required. With the addition of suitable sensors 216, such as trough position sensors, and electronics, motion feedback from the conveying surface could be employed to automatically change the velocity profile to maintain a specific feed characteristic of the conveyor.

The invention provides a further improvement over known mechanically driven differential motion conveyors. These known conveyors utilize a mechanical motor driven mechanism that generates only fixed sinusoidal periodic velocity profiles compared to the complex velocity profiles that can be programmed by the equipment of the present invention. The versatility of the present invention allows optimization of conveying performance over a broad range of materials, material characteristics, and inclinations of the conveying surface.

Figure 4:
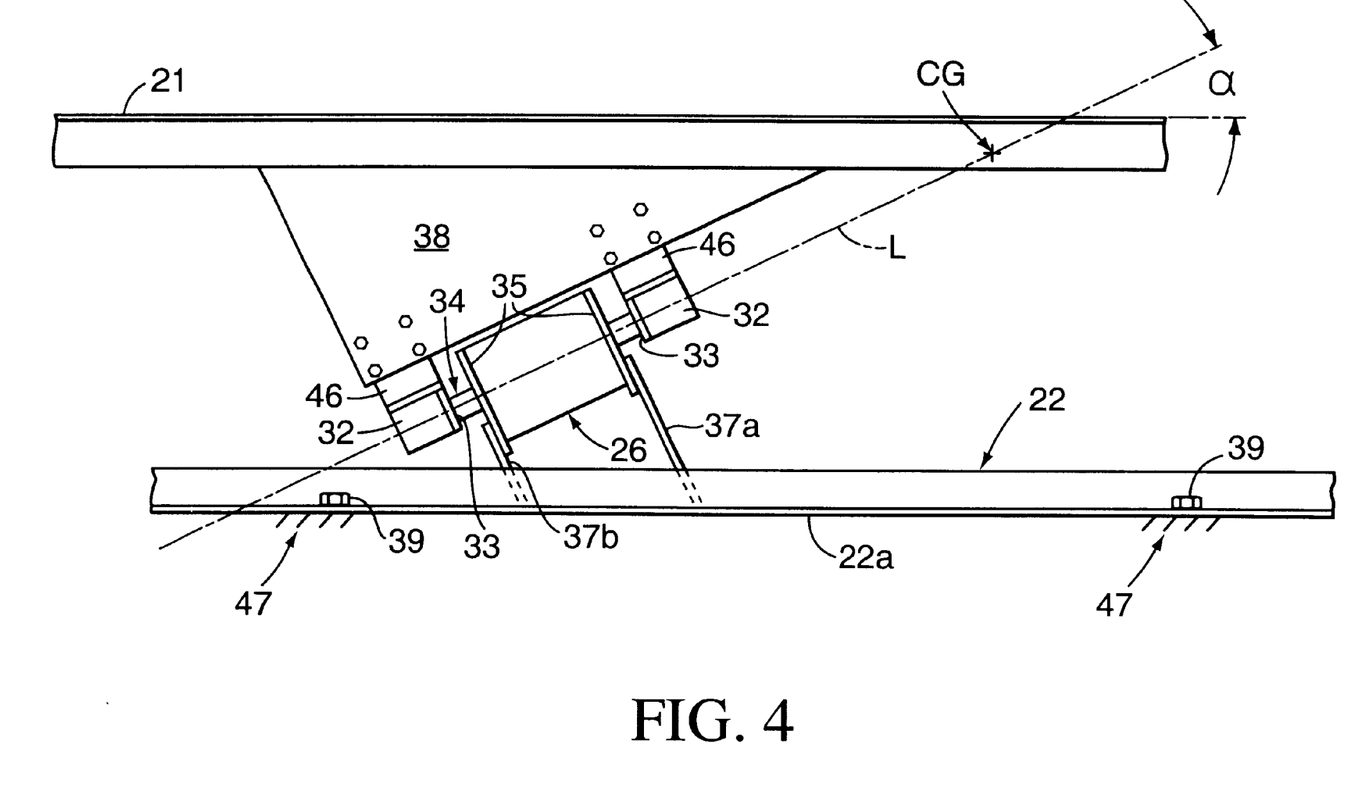
FIG. 4 is a side elevational view of the conveyor of FIG. 1.

FIG. 4 illustrates how the linear motor might be utilized as a "single mass," sometimes referred to as "brute force" conveyor. The trough 21 is shown connected by means of the trough side wing plates 38 to the armature shaft ends 34a, 34b of the linear motor drive 26, by means of mounting brackets 46. The mounting brackets 46 are fastened to the two cross frame members 32, that are connected to the armature brackets 33, and then to the armature shaft ends 34a, 34b, of the linear motor 26, in a manner similar to that shown in FIG. 3. The linear motor 26 is connected by means of the plate brackets 35, and base mounting frame members 37a, 37b to the base members 22a, 22b. The base mounting frame members 37a, 37b are connected by fasteners or by welding between and to the two base members 22a, 22b. The base members 22a, 22b are securely fastened to a solid foundation, a concrete slab or the like, by means of fasteners 39.

The linear motor 26 is mounted at a feed angle a to the horizontal, such that an imaginary line, a "drive line" L, passes through the longitudinal axis of the armature shaft ends 34a, 34b. The drive line L will usually also pass through, or close to, the center of gravity CG of the combined masses of the trough 21, and the trough side wing plates 38, to avoid unwanted structural stresses caused by off-axis loading.

The vibratory conveyors illustrated in FIGS. 4 through 7 all operate on substantially the same principle of conveying particles. The conveyor trough is made to reciprocate or vibrate back and forth along an inclined drive line that is at a specific angle $\alpha$ to the horizontal, such that a particle resting on the conveying surface is accelerated and decelerated as the conveying surface moves back and forth. As the conveying surface is accelerated upward, the acceleration is imparted to the particle. When the acceleration on the particle becomes greater than −1 g., the particle leaves the surface at a trajectory defined by the angle $\alpha$, is acted upon by gravity and falls, landing back on the conveying surface downstream a distance from the point it left the conveying surface. The distance depends on the acceleration, the angle $\alpha$, and the displacement (stroke) of the conveying surface.

The single mass conveyor of FIG. 4 is powered directly by the linear motor 26. According to this embodiment of the invention, the conveying member or trough 21 is rigidly, operatively connected to the armature shaft ends 34a, 34b of the linear motor 26, and made to reciprocate back and forth relative to the frame 22, when the linear motor 26 is activated. The case 26a of the linear motor 26 is rigidly, operatively connected to the base members 22a, 22b which are rigidly mounted to a solid slab capable of absorbing the dynamic vibratory forces generated by the conveyor as it operates.

Prior art directly powered conveyors are typically driven by mechanisms employing rotating eccentric weights powered by an electric motor. Typically, the drive includes at least two shafts geared together with pairs of eccentric weights carried on each shaft. The eccentric weights are arranged such that all generated force vectors cancel as the shafts counter rotate, except for the force vectors aligned along the drive line where the forces add to one another, producing an essentially linear reciprocating force along that drive line. The linear motor 26 of the present invention greatly reduces the complexity of prior art directly powered drives, by reducing the number of component parts.

Figure 5:
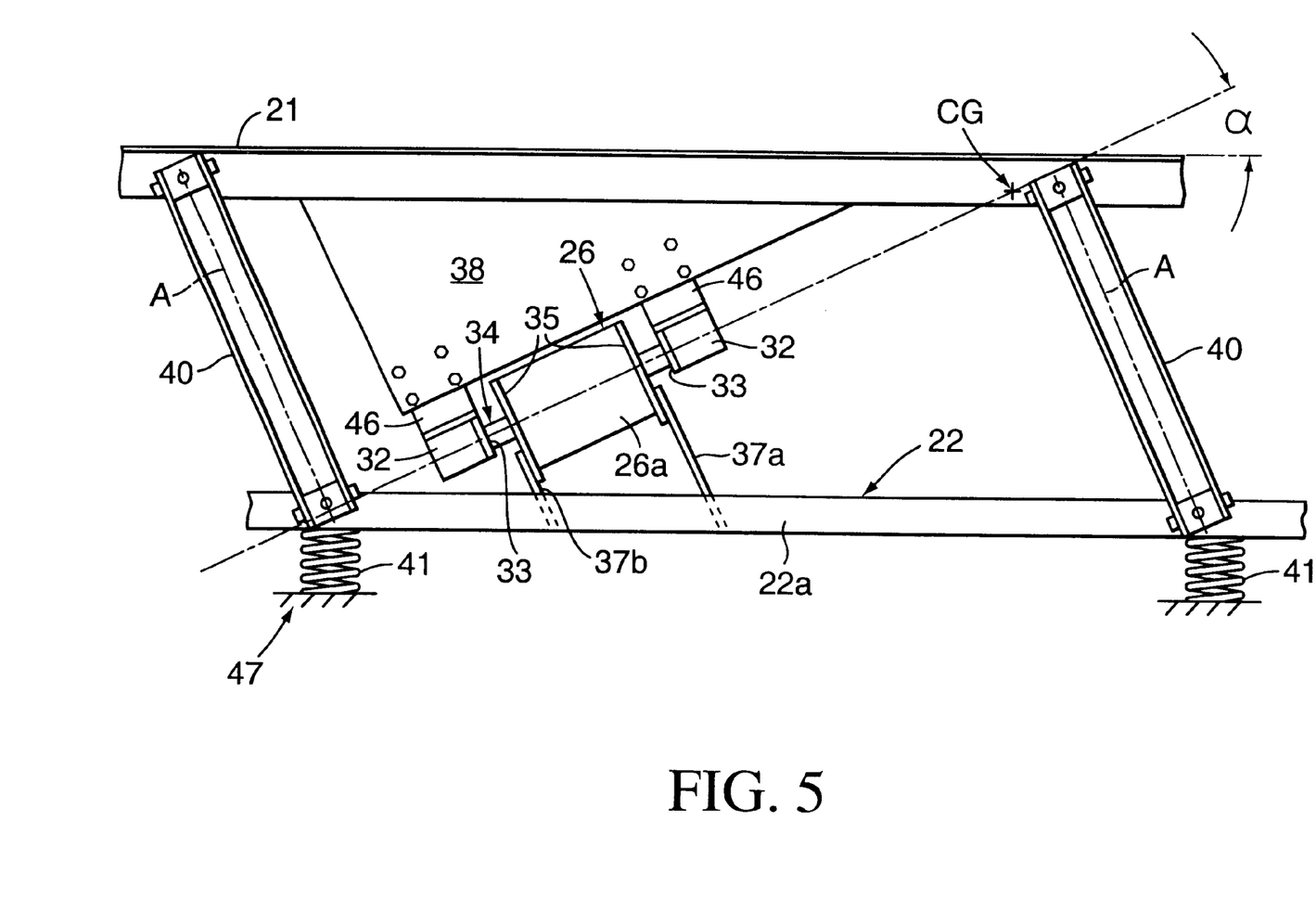
FIG. 5 is a side elevational view of an alternate embodiment of the conveyor of the present invention.

FIG. 5 illustrates how the linear motor might be utilized as the drive mechanism for a "two mass" conveyor. The trough 21 or other conveying member is shown connected by means of the trough side wing plate 38 to the armature 34 of the linear motor drive 26. The trough 21 is connected to the armature 34 by means of the mounting brackets 46 which in turn are fastened to the two cross frame members 32. The frame members 32 are connected to the armature brackets 33, and then to the armature shaft ends 34a, 34b, of the linear motor 26, in a manner similar to that shown in FIG. 3. The linear motor case 26a is connected by means of the brackets 35, and the base mounting frame members 37a, 37b to the base longitudinal members 22a,b. The base mounting frame members 37a, 37b are connected by fasteners or by welding between and to the two base members 22a,b. The linear motor 26 is mounted at the feed angle α to the horizontal, and such that an imaginary line, the drive line L, that passes through the longitudinal axis of the armature shafts 34a, 34b, will usually also pass through, or close to, the center of gravity CG of the combined masses of the trough member 21, and the trough side wing plates 38. This arrangement avoids unwanted dynamic motion, pitching and the like, and structural stresses caused by off-axis loading. A plurality of resilient leaf spring members 40 are connected between the trough member 21 and the base members 22a, 22b, such that vertical axes A of the spring members are normal to the drive line L. The spring members 40 support the trough 21 from the base 22. The base members 22a,b are isolated from the support foundation 47 by means of the isolating springs 41.

The two mass conveyor of FIG. 5 operates in a similar manner to that of the conveyor of FIG. 4, except this device takes advantage of the phenomenon of mechanical resonance to reduce the power required to operate the equipment. Prior art drives for this type of conveyor employ either an electromagnetic drive or a form of the rotating eccentric weight drive described above. In an electromagnetic drive, the magnet armature would usually be operatively attached to the trough, and the pole faces of the magnet operatively attached to the base, such that in operation, the armature is attracted to the pole faces when power is applied to the coil of the electromagnet. If periodic pulsating power is applied to the coil of the electromagnet, the conveyor would reciprocate back and forth. In practical designs, the maximum stroke obtainable is usually under 0.1", since the magnetic force generated is approximately inversely proportional to the square of the distance between the armature and pole face. This means the conveyor would have to operate at higher frequencies, say 30 Hz and above, in order to achieve the accelerations needed to obtain the commercially desired conveying feed rates.

The relationship between the mass of the trough 21 and base members 22a,b to the spring members 40 is such that an applied momentary external force causes a damped vibration at their natural frequency. If this natural frequency were close to the operating frequency of the drive system, such that the periodic pulsating power applied to the system acts in concert with the energy stored and released by the spring members 40, the system takes advantage of the resonance phenomenon and consequently the power required to sustain the resulting vibration is reduced to about one fourth of that required by the system of FIG. 4. The conveying member or trough 21, by being rigidly, operatively connected to the armature 34 of the linear motor 26, is made to reciprocate back and forth relative to the base 22, when the linear motor 26 is activated, to take advantage of the resonance phenomenon as described above. The isolating springs 41 absorb the dynamic forces generated by the feeder/conveyor as it operates.

Figure 6:
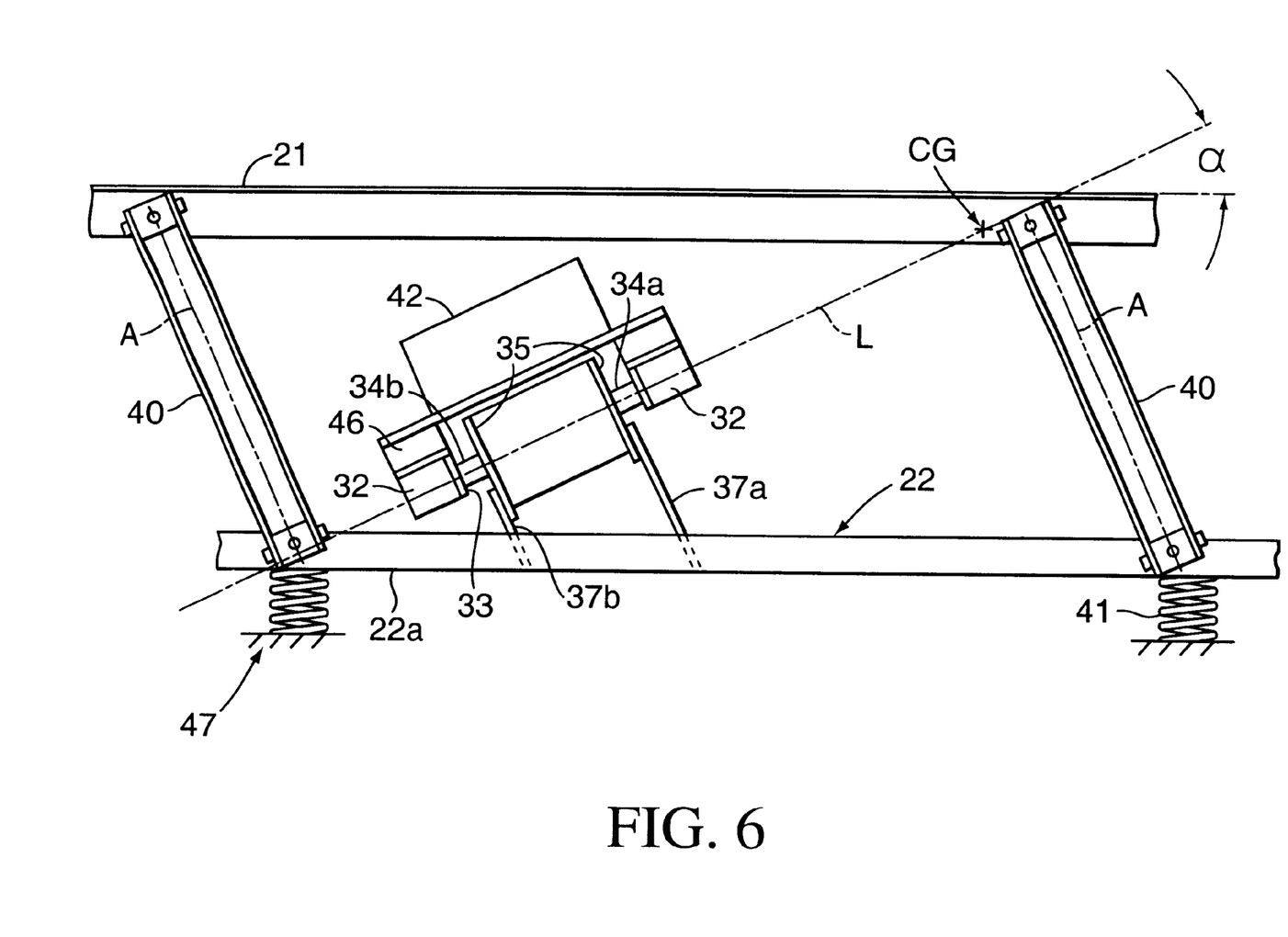
FIG. 6 is a side elevational view of a further alternate embodiment conveyor of the present invention.

FIG. 6 illustrates how the linear motor might be utilized as the drive mechanism for a "base excited" conveyor. A counterweight or block 42 is fastened to the two cross frame members 32 by means of the mounting brackets 46. The cross frame members 32 are connected to the armature brackets 33, and then to the armature shaft ends 34a, 34b, of the linear motor 26. The linear motor 26 is connected by means of the brackets 35, and the base mounting frame members 37a, 37b, to the base members 22a,b. The base mounting frame members 37a, 37b are connected by fasteners or by welding between and to the two base members 22a,b.

The linear motor 26 is shown mounted at the feed angle α to the horizontal, and such that an imaginary line, the drive line L, passes through the longitudinal axis of the armature line 34 of the linear motor 26. The drive line L will usually also pass through, or close to, the center of gravity CG of the combined masses of the trough 21 to avoid unwanted dynamic motion, pitching and the like, and structural stresses caused by off-axis loading. The trough 21 is shown connected by the plurality of resilient spring members 40 to the base members 22a, 22b, such that vertical axes of the spring members 40 are normal to the drive line L. The spring members 40 support the trough from the base 22. The base members 22a,b are isolated from the support foundation 47 by means of the isolating springs 41.

When the armature 34 is made to reciprocate back and forth, the acceleration of the counterweight 42 generates a force that is applied to the trough 21 and spring members 40 through the base members 22a, 22b. The frequency of this periodic force is adjusted to be close to the natural frequency of the base members 22a, 22b, and the trough mass/spring system, to take advantage of resonance as previously explained. Further, in this configuration, the trough mass/spring relationships may be adjusted, by changing the weight of the trough 21 with respect to the base members 22a, 22b and making corresponding corrections to the spring system, such that the stroke on the base be made minimal, using calculations known by those skilled in the art. With minimal stroke on the base members 22a, 22b, the dynamic forces generated by the operation of the conveyor are minimized and therefore easily absorbed from the mounting support 47 by the isolation springs 41.

Figure 7:
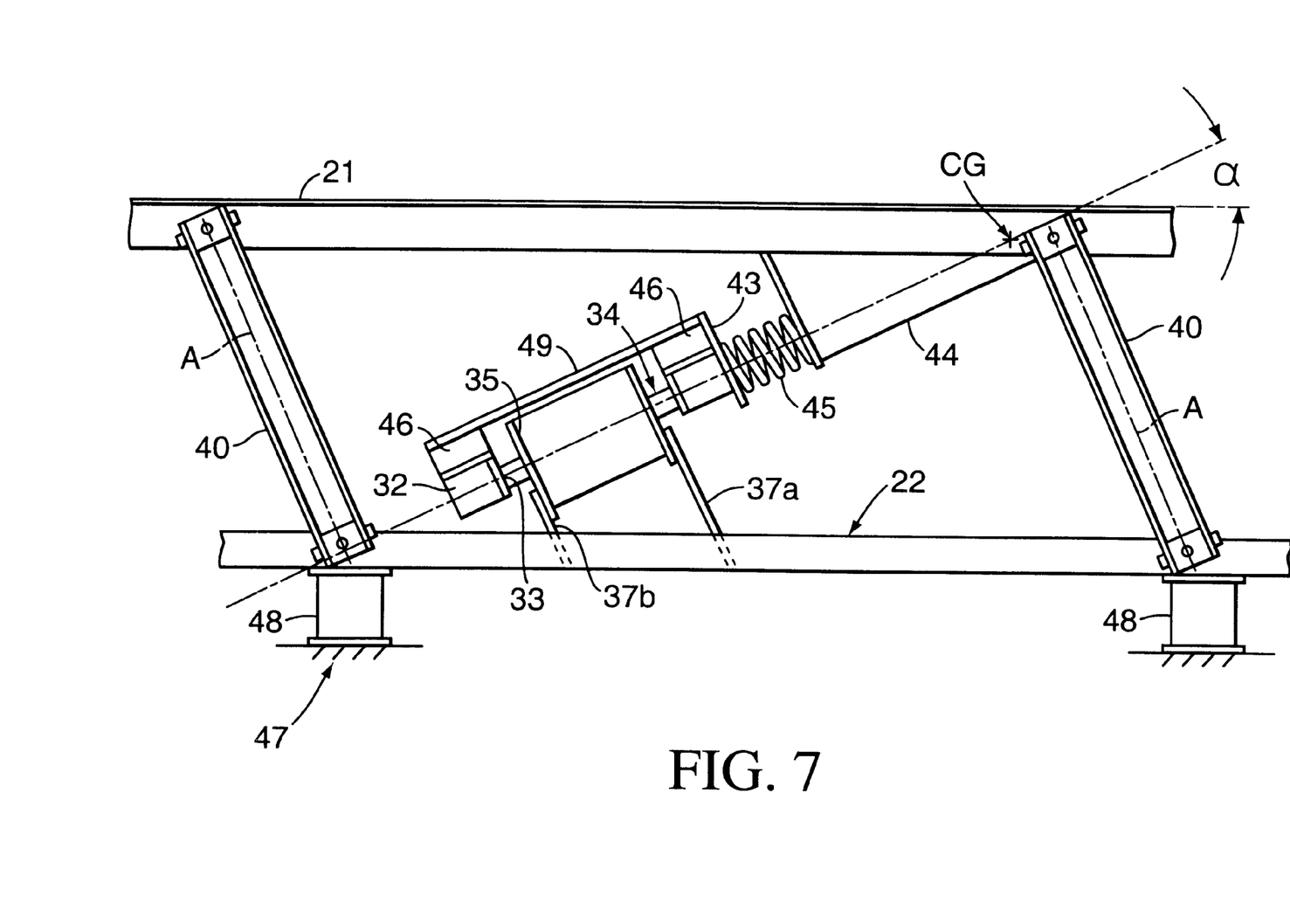
FIG. 7 is a side elevational view of a still further alternate embodiment conveyor of the present invention.

FIG. 7 illustrates how the linear motor might be utilized as the drive mechanism for a "soft start" conveyor. A frame 49 is fastened to the two cross frame members 32 by means of the mounting brackets 46. The mounting brackets 46 are connected to the armature brackets 33 which are connected to the armature shaft ends 34a, 34b, of the linear motor 26. A "soft start" trough spring 45 is located between the spring mounting plate 43 fastened to the frame 49, and the trough connecting bracket 44 which is fastened or welded to the trough 21. The soft start spring 45 minimizes the initial force required when starting the conveyor and helps to avoid structural stresses caused by start up forces and off-axis loading. The linear motor 26 is connected by means of the brackets 35, and the base mounting frame members 37a, 37b to the base members 22a,b. The base mounting frame members 37a, 37b are connected by fasteners or by welding between and to the two base members 22a,b. The linear motor 26 is shown mounted at the feed angle α to the horizontal, and such that an imaginary line, the drive line L, passes through the longitudinal axis of the armature shaft 34 of the linear motor 26. The drive line L will usually also pass through, or close to, the center of gravity CG of the combined masses of the trough member 21 to avoid unwanted dynamic motion, pitching and the like. The trough 21 is shown connected by a plurality of resilient spring members 40 to the base members 22a, 22b, such that vertical axes of the spring member 40 are normal to the drive line L. The spring members 40 support the trough 21 from the base 22. The base members 22a,b may be directly fastened to the support foundation 47 by means of pedestals 48 or the like, or isolated from the support foundation 47 by means of the isolating springs 41, as shown in FIG. 6.

The soft start conveyor of FIG. 7 is another alternative conveyor design to the single mass design (FIG. 4) that takes advantage of resonance to minimize the power required to start and to operate the conveyor while de-coupling the dynamic forces generated on start up and shut down from the support foundation.

When the linear motor armature 34 is made to reciprocate back and forth, the soft start spring 45 is deflected, transferring a driving force to the trough mass/spring system comprised of the trough 21 and bracket 44 and the spring members 40. The natural frequency of the trough mass/spring system is adjusted to be at resonance with the operating frequency of the conveyor thereby minimizing the initial force required to start and operate the conveyor and at same time to help avoid structural stresses caused by the start up forces and any off-axis loading. On start up, the spring 45 deflects a maximum amount, representing the systems maximum force transfer, which decreases to a minimum as the phase shift between the driving force stroke and the motion of the trough mass/spring system approaches a minimum under the resonant condition previously explained.

Figure 8:
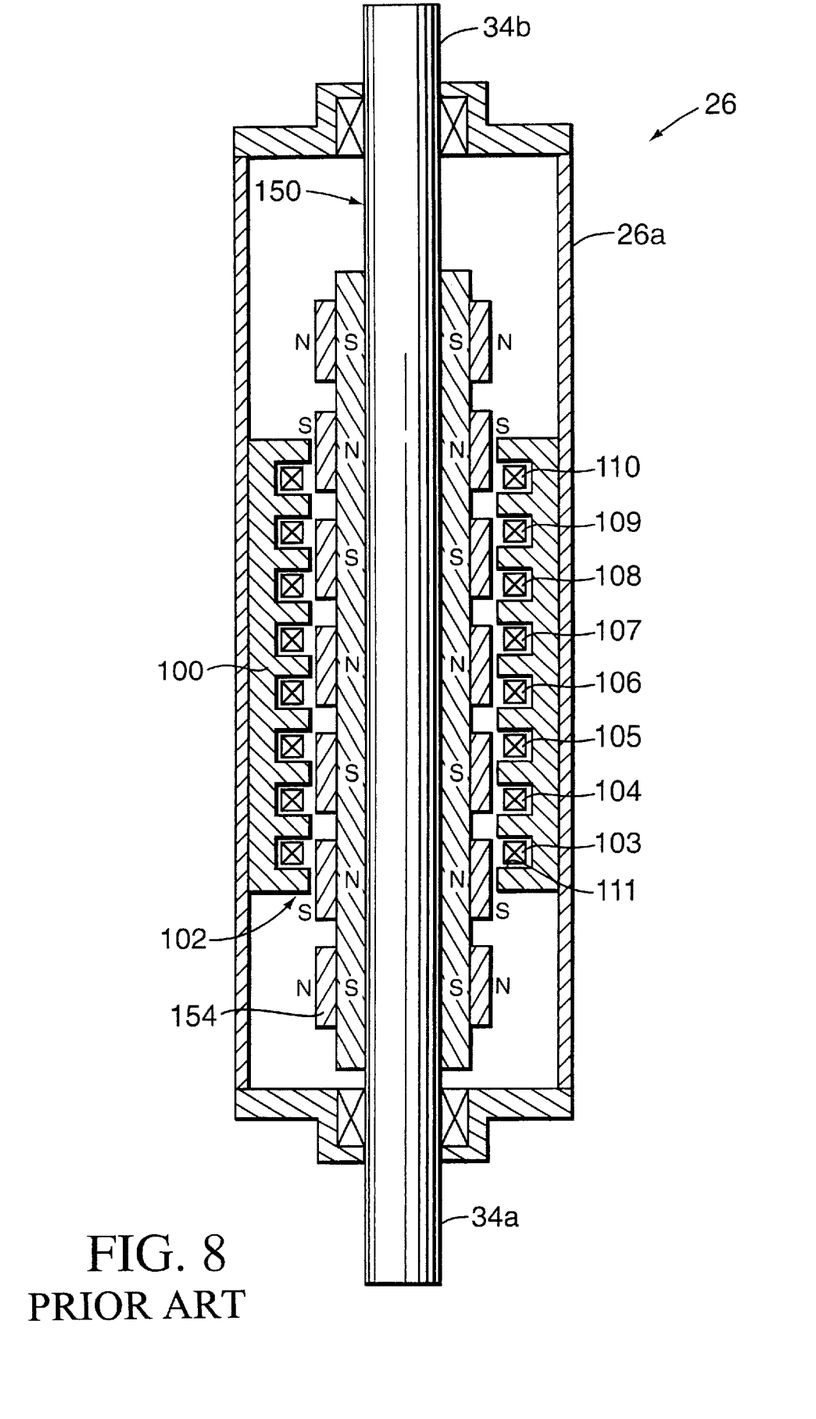
FIG. 8 is a schematic longitudinal sectional view of the linear motor used in the conveyors of the present invention.

Cylindrical moving magnet motors are described for example in U.S. Pat. No. 5,602,431, herein incorporated by reference. FIG. 8 illustrates in schematic fashion, one possible structure of the linear motor 26 of the present invention which corresponds to FIGS. 11 and 12, and corresponding description in U.S. Pat. No. 5,602,431. A stator core 100 is located within the casing 26a. The stator includes laminated stator teeth 102. Ring-like windings 103 to 110 are disposed within grooves 111 formed between the teeth 102. The polarities of the ring-like windings 103, 105, 107, and 109 can be connected so that the polarities thereof are reversed alternately to form one phase (A phase) and the ring-like windings 104, 106, 108, and 110 are connected to form another phase (B phase). A mover core 150 which is colinear and extends into the shaft ends 34a, 34b is cylindrical and carries permanent magnet poles 154 which are magnetized to have alternating different radial polarities.

FIG. 8 describes in general a moving magnet linear motor. Applicants have particularly discovered that the linear motor model #2518 (or other model depending on conveyor or feeder size or capacity requirements), available from the aforementioned California Linear Devices, Inc., (formerly Avcon), is particularly suited for driving vibratory conveyors. This linear motor has a speed which can approach the speed of voice coil actuators. The particular linear motor uses an unconventional magnetic circuit in a cylindrical armature, and a three-phase wound stator assembly (see FIG. 9). The configuration is compact and accommodates an increased amount of magnet material and coil windings in the actuator. The design provides a minimum magnetic circuit length and short air gaps that increases efficiency and increases force capability. The linear motor uses small air gaps and tight fits to obtain needed volumetric efficiency. The motor has high force-to-power and force-to-weight ratios, and substantially eliminates mechanical wear. The moving magnet motor can be synchronized with the electrical sequencing of the field coils of the stator.

This linear motor can be operated as set forth in U.S. Pat. No. 5,409,101 herein incorporated by reference. The motor can be driven with a cyclical, nonuniform motion by controlling the stroke or amplitude of the trough reciprocation independently of the frequency. This can be accomplished by regulating the cyclical nonuniform power supply to the motor.

All of the embodiments heretofore described represent improvements over the prior art by avoiding complex mechanical drive mechanisms, including belts, gears, pulleys, bearings, and separate electric motors. The inventive linear drive motor can provide long strokes and complex velocity profiles that can be programmed by the equipment of the invention. These advantages result in optimization of conveying performance over a broad range of materials, material characteristics, and inclinations of the conveying surface.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A differential motion conveyor, comprising:

a base;

a trough supported non-rigidly from said base;

a cylindrical linear motor having an armature and an annular stator surrounding said armature, one of said armature and said stator having a plurality of coils in series and the respective other of said armature and said stator having a plurality of magnets in series, with one of said annular stator and said armature rigidly connected to said trough for driving said trough into reciprocation, and the respective other is rigidly connected to said base.

2. The differential motion conveyor according to claim 1, wherein said stator is rigidly connected to said base and said armature shaft is rigidly connected to said trough.

3. The differential motion conveyor according to claim 1, further comprising base springs, and said base is supported on said base springs.

4. The differential motion conveyor according to claim 1, wherein said armature includes a plurality of ring shaped magnets arranged in series.

5. The differential motion conveyor according to claim 4, wherein said stator includes a plurality of annular shaped coils, said coils alternately wired for three phase power.

6. A differential motion conveyor, comprising:

a base;

a trough supported from said base;

a cylindrical linear motor having an armature and an annular stator surrounding said armature, one of said armature and said stator having a plurality of coils in series and the respective other of said armature and said stator having a plurality of magnets in series, with one of said annular stator and said armature operatively connected to said trough for driving said trough into reciprocation; and wherein said base comprises two base members arranged longitudinally, and spaced apart in parallel, and comprising parallel drive frame members which connect the base members and are each connected to the stator, two guide rods supported on said drive frame members, and a pair of linear bearings carried by each guide rod, a pair of cross frame members connected to said linear bearings and guided on said guide rods to move longitudinally with respect to said base members, said cross frame members having opposite ends operatively connected to said trough, said armature operatively connected to each of said cross frame members.

7. A differential motion conveyor, comprising:

a base;

a trough supported above said base, supported non-rigidly with respect to said base;

a cylindrical linear motor which includes an annular stator having a plurality of annular shaped coils in series, said stator rigidly connected to said base, and a cylindrical armature having a plurality of magnets in series, said armature rigidly connected to said trough for driving said trough into reciprocation.

8. The differential motion conveyor according to claim 7, wherein said coils are alternately wired according to each phase of a three phase power supply.

9. The differential motion conveyor according to claim 7, further comprising base springs, and said base is supported on said base springs.

10. A differential motion conveyor, comprising:

a base;

a trough supported from said base;

a cylindrical linear motor which includes an annular stator having a plurality of annular shaped coils in series, and a cylindrical armature having a plurality of magnets in series, one of said stator or said armature connected to said trough for driving said trough into reciprocation; and wherein said base comprises two base members arranged longitudinally, and spaced apart in parallel, and comprising parallel drive frame members which connect the base members and are each connected to the stator, two guide rods supported on said drive frame members, and a pair of linear bearings carried by each guide rod, a pair of cross frame members connected to said linear bearings and guided on said guide rods to move longitudinally with respect to said base members, said cross frame members having opposite ends operatively connected to said trough, said armature operatively connected to each of said cross frame members.

\* \* \* \* \*